United States Patent Office 2,871,383
Patented Jan. 27, 1959

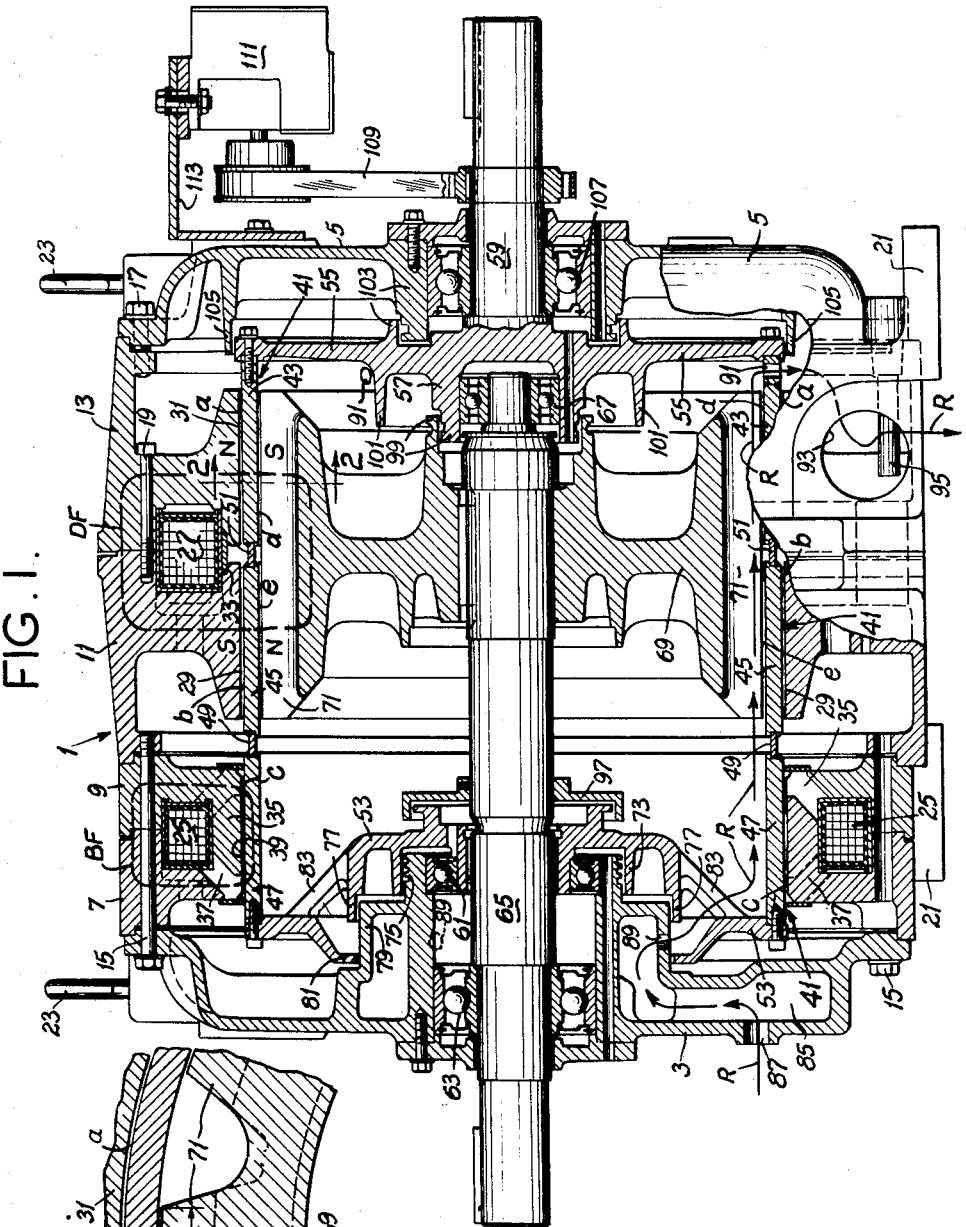

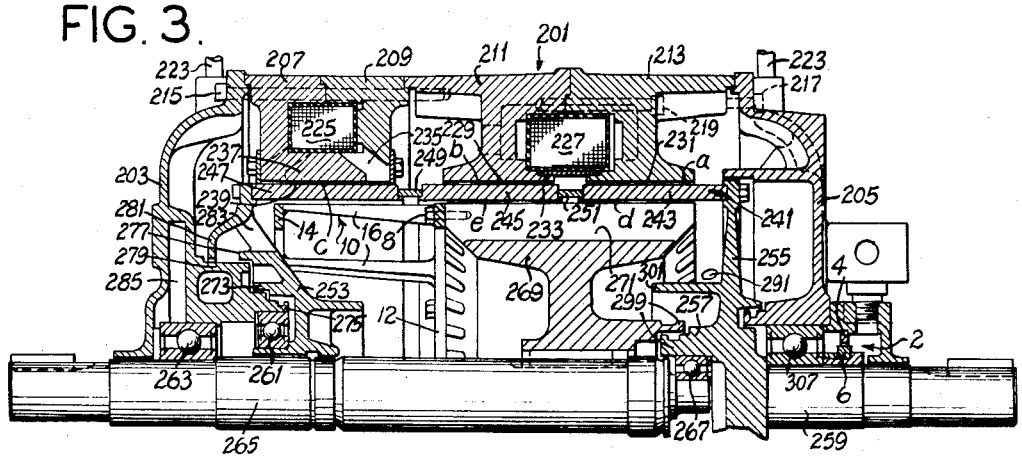

2,871,383

ELECTRIC COUPLING AND BRAKE

William F. King, Wauwatosa, Wis., assignor to Eaton Manufacturing Company, Cleveland, Ohio, a corporation of Ohio Application May 14, 1956, Serial No. 584,863

9 Claims. (Cl. 310—96)

This invention relates to electric couplings and brakes, and with regard to certain more specific features, to a combined eddy-current liquid-cooled electric coupling and brake for application to various apparatus, such as for driving punch presses, tension feeds and the like.

This application is a continuation in part of my United States patent application Serial No. 563,289, filed February 3, 1956, for Electric Coupling and Brake, abandoned since the filing of this application.

Among the several objects of the invention may be noted the provision of a simple and compact form of eddy-current coupling element having in cooperation a stationary field member, a relatively movable polarizing rotor, and an intermediate inductor drum, so designed as to prevent the field member from operating as a parasitic brake; the provision of a compactly arranged nonparasitic brake element also having a stationary field coil; the provision of liquid-cooling and stirring arrangements for both the brake and coupling elements, adapted for maximum cooling effects without subjecting the field coils of the machine to complete liquid immersion; the provision of apparatus of the class described in which the nonparasitic brake element and the cooling arrangements therefor may be conveniently removed and the device used as an eddy-current coupling per se; and the provision of apparatus of this class for punch press applications having improved bearing supports for the driving, driven and flywheel elements and wherein said driven elements have a comparatively low moment of inertia. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is an axial section through a combined eddy-current coupling and brake embodying one form of the invention;

Fig. 2 is a fragmentary enlarged cross section taken on line 2—2 of Fig. 1;

Fig. 3 is a half axial section similar to Fig. 1, illustrating a form of the invention in which certain coolant stirrers are used in connection with a brake element;

Fig. 4 is a view similar to Fig. 3, showing the brake element and the stirrers removed and the machine shortened to function purely as a coupling; and Fig. 5 is a longitudinal section showing a form of the invention for a punch press drive.

Corresponding reference characters indicate corresponding parts throughout the several views of the drawings.

Briefly, the present invention comprises driving and driven members on one of which is a solid magnetizable armature or inductor drum assembly, within which is a magnetizable toothed polar member attached to the other member. Outside of the drum in the plane of the toothed polar member is an annular field member having non-toothed homogeneously magnetizable pole rings excited by means of an annular field coil therebetween. On the outside of the drum and in another plane is a stationary magnetizable field member having interdigitated toothed pole rings excited by means of a second annular field member.

The inductor drum assembly in the plane of the inner toothed polar member is so constructed that distortions do not appear in the homogeneous magnetization of the outside pole rings, thus avoiding undesired parasitic brake effects. The flow of coolant is arranged to occur serially within the solid drum, first across its braking parts and then across its coupling parts, with subsequent ejection from the machine without immersing either of the coils. Means are provided for stirring the coolant within the drum in both of its coupling and braking parts. Provision is also made for arranging the machine as a combined eddy-current coupling and brake, or as an eddy-current coupling per se without a brake. Means are also employed for applying the invention to the driving of a punch press requiring both a motor and flywheel driving element and a low-inertia driven element. Typical applications of the structure embodying the invention, and typical control circuits therefor, will, for example but without limitation, be found in U. S. Patents 2,630,467 and 2,658,751.

Referring now more particularly to the drawings, there is shown in general at numeral 1 a housing consisting of end bells 3 and 5 between which are adjoined magnetizable pole rings 7, 9, 11 and 13. Rings 7 and 9 are held together, and also with the end bell 3 and ring 11, by means of bolts 15. Ring 13 is attached to end bell 5 by means of bolts 17 and to ring 11 by means of bolts 19. The rings 11 and 13 carry supporting pads 21, and the end bells 3 and 5 carry eye bolts 23 for lifting. Nested between the rings 7 and 9 is an annularly wound field coil 25. Nested between the rings 11 and 13 is an annularly wound field coil 27. The inner faces 29 and 31 of the rings 11 and 13, respectively, are smooth and coaxially cylindric and constitute north (N) and south (S) poles of peripherally homogeneous circular forms. Within the coil 27, the rings 11 and 13 are separated by means of a nonmagnetic ring 33 and an adjacent air gap.

The inner portions of the rings 7 and 9 are constituted by magnetizable teeth 35 and 37 which interdigitate peripherally within the coil 25. They produce a peripheral ring of adjacent north and south poles. The inner faces of the teeth 35 and 37 are cylindrically machined coaxially with the cylindric inner faces 29 and 31, as indicated at 39.

Within the rings 7, 9, 11, 13 is disposed a drum assembly 41 consisting of an inwardly and outwardly smooth cylindric magnetizable drum 43 within face 31 of ring 13; an inwardly and outwardly smooth cylindric magnetizable drum 45 within face 29 of ring 11; and an inwardly and outwardly smooth cylindric magnetizable drum 47 within the teeth 37, 35 of rings 7 and 9. These drums 43, 45, 47 are structurally joined but magnetically separated by means of nonmagnetic rings 49 and 51. Small outer magnetic gaps $a$, $b$ and $c$ are thus provided. The drum assembly 41 is bolted to left- and right-hand open and solid drum supports 53 and 55, respectively. The solid drum support 55, through a hub 57, is attached to a shaft 59, which may be taken as the driven member of the apparatus. The open drum support 53 is carried upon bearings 61 within the end bell 3. Carried upon separate bearings 63 in this end bell 3 is a shaft 65 which may be the driving member of the apparatus. At its other end, the shaft 65 is supported upon a pilot bearing 67 within the hub 57. Keyed to the shaft 65 within the drums 45 and 43 is a magnetizable rotor assembly 69 which on its outside periphery carries axially extending magnetizable polar teeth 71. These are externally cylindrically machined to provide inner magnetic gaps $d$ and $e$.

The drum support 53 includes a flange 73 cooperating with labyrinth seals 75 on the bell 3. It also has an additional axial flange 77 providing a sealing effect with the cylindric portion 79 on the end bell. Another radial flange 81 sealingly cooperates with the same cylindric portion 79. Spokes 83, connecting members 53 and 81, serve to provide openings therebetween for passage of coolant.

The end bell 3 is hollow, as shown at 85, an inlet 87 being provided for introduction of a coolant such as water. One or more ports 89 allow passage of this water from the end bell 3 through the openings between spokes 83 of the drum support into the drum assembly 41. The drum assembly also has one or more openings 91 at its opposite end, allowing escape of the coolant into hollow portions of the end bell 5 and ring 13. An opening 93 is provided in ring 13 for the final run-out of the coolant. A thermostatic control bulb 95 is positioned adjacent the outlet 93 for detecting the coolant temperature and providing through a suitable circuit in known manner a control for a suitable valve throttling the amount flowing into the inlet 87. Coolant is prevented from reaching the bearing 61 by means of a shield 97, and from reaching the bearing 67 by means of telescoping shields 99 and a slinger flange 101. Telescoping shields 103 and a flange 105 protect the bearing 107, which supports the shaft 59 in the end bell 5.

The shaft 59 has a belt drive 109 to a governor generator assembly 111, mounted on bell 5 by means of a bracket 113. As will be clear to those skilled in the art, the coils 25 and 27 may be supplied with exciting current from suitable circuits for the purpose. The circuit which supplies coil 27 may be made responsive to governing action from the governor 111. When coil 27 is excited, a toroidal field such as suggested by the dash lines DF is generated. When the field coil 25 is excited, a toroidal field such as suggested by the dash lines BF is generated. It will be understood that, in general, the coil 27 is excited under driving conditions, and the coil 25 is excited under braking conditions; but under certain other conditions they may be simultaneously excited to various degrees. This requires no further elaboration in view of the state of the clutch and brake control art.

Operation is as follows, assuming a prime mover to be attached to the drive shaft 65, a load attached to the driven shaft 59, coil 25 deexcited and coil 27 excited:

The toroidal magnetic flux field DF is established interlinking the pole rings 11, 13, gap $a$, drum 43, gap $d$, teeth 71, gap $e$, drum 45 and back to ring 11 via gap $b$. This field is circularly polarized on opposite sides of coil 27, as shown for example at N and S. Each circular polarization is peripherally homogeneous across its respective gap $a$ or $b$. Each of the moving teeth 71 becomes axially oppositely polarized as at S and N, thus sweeping non-homogeneous concentrations of flux through gaps $d$ and $e$ and into the insides of the initially stationary drums 43 and 45. These concentrations induce eddy currents in these drums, the resulting magnetic fields of which react with the field concentrations from teeth 71, thereby exerting an accelerating force on the drum assembly 41 and hence on the driven shaft 59. At a predetermined speed, as determined by manual control or the action of the governor 111 on the circuit exciting the coil 27, steady-state conditions are reached in which shaft 65 drives shaft 59 with a certain rotary slip.

It has heretofore been believed that wall thicknesses T of drums such as 43, 45 should be as thin as possible for best electrical performance, but I have discovered that if the drums 43 and 45 are constructed with wall thicknesses T which are too thin relative to tooth face widths W, flux saturation values in drums 43 and 45 may be exceeded and the poles N and S of teeth 71 will then effect distortion of the flux circuit DF across the gaps $a$ and $b$. This results in eddy currents in, and a braking action upon, the drum assembly 41, which should be avoided.

In order to avoid the above-mentioned distorting effect, the drums 43 and 45 in the present example are, for example, composed of Armco iron (.02 carbon with all other residuals including carbon not greater than one-tenth of one percent) and the rotor assembly 69 of dynamo steel (.07–.012 carbon). Then in a machine having sixteen teeth 71 and of a diameter of approximately 17 inches at gaps $a$, $b$, the length of each gap $a$, $b$, $d$, $e$, should be approximately 4¾ inches, the thicknesses T of the drums 43 and 45 should be approximately ½ inch, and the widths W of the teeth should be about 1 inch. This arrangement avoids flux saturation in the drums 43 and 45 and therefore avoids distortion of the field DF across gaps $a$, $b$ by the flux-concentrating effects of the poles N, S of teeth 71 across gaps $e$ and $d$. Thus in the particular form of the machine disclosed, the ratio $$\frac{W}{T}$$

is 2½ or less, in order to prevent flux in excess of saturation values in the drums 43 and 45.

If the thicknesses T of the drums 43 and 45 are increased above the minimum critical value relative to the tooth width W, the desired condition is also obtained, i. e., prevention of any disturbance of the homogeneous fields across gaps $a$ and $b$. It is also preferable that approximately one-half the area of the end faces of teeth 71 shall be less than any section of metal in circuit DF and at right angles thereto. This produces maximum eddy currents and therefore maximum coupling effect for a given excitation. Obviously the dimensions may be different for different sizes and capacities and different material constituting rotor 69 and drums 43, 45. In any event, the rule should be observed that the thicknesses T of the drums 43 and 45, in view of the widths of the teeth 71, should be sufficient to avoid magnetic saturation of the drums 43 and 45.

Assuming now that the driven shaft 59 is rotating, and that it is desired to exert a braking action thereon, the coil 27 is partially or completely deexcited and coil 25 excited. This engenders the flux circuit BF, looping ring 9, teeth 35, gap $c$, drum 47, gap $c$, teeth 37 and ring 7. The resulting flux concentrations in the rotating drum 47 generate eddy currents with reactive fields which exert a braking action on the entire drum assembly 41, and accordingly on the shaft 59. The kinetic energy absorbed is converted into heat in drum 47.

Coolant which enters the inlet 87 passes into the drum assembly 41 through the opening 89 and progresses between the spokes 83, then passing serially through the insides of the drums 47, 45 and 43. Centrifugal force and some driving action from teeth 71 distribute the coolant, which finally escapes through openings 91 to the outlet 93. Thus heat engendered during both driving and braking conditions is efficiently carried off. Since the drums 47, 45, 43, rings 49, 51, and the support 55 form a solid cup, flooding of the coils 25 and 27 is prevented. It will be understood that a thin film of liquid is preferable on the insides of the drums 47, 45 and 43. The axial path of the liquid is suggested by the darts R at the bottom of the drawing, it being understood, however, that the liquid spreads centrifugally over the inner drum surfaces.

It will be observed that the arrangement of the drums 47, 45 and 43, being such that they are coaxial and their outside cylindric surfaces of equal diameters, results in the ability easily (by continuous cuts) to machine their external surfaces. The same is true of their internal surfaces. Moreover, the equality of their internal diameters results in maintenance of an even coolant film throughout all their interiors under action of centrifugal force.

Fig. 3 shows a form of the invention in which most of the parts are essentially the same, and function in the same manner, as corresponding parts in Fig. 1. In order to avoid circumlocution of description, such parts have been identified by numerals which are the same as the numerals of the corresponding parts in Fig. 1, except that they have been raised by two hundred; thus, for example, part 1 of Fig. 1 is identified by 201 in Fig. 3; part 11 becomes 211; and part 101 becomes 301, et cetera. These similar parts will not be again described.

It will be understood that although the lower halves of the parts illustrated in Fig. 3 are not shown, they are constructed similarly to the lower halves of the corresponding parts in Fig. 1 as regards means for introducing circulating and expelling coolant.

A first point of departure of the construction shown in Fig. 3 over that shown in Fig. 1 is that instead of using the belt-driven governor generator 111 (Fig. 1), the generator on Fig. 3 is constituted by a permanent-magnet generator assembly 2 attached at the end of the end bell 205. This has a stator 4 and a rotor 6 on the shaft 259.

There is also removably attached to rotor assembly 269, as by means of bolts 8, a stirrer indicated generally at 10. This is composed of a bolt ring 12 and an end ring 14. The rings 12 and 14 are joined by stirrers or paddles 16 which extend axially with a small clearance into the brake drum 247. Thus the coolant which flows through the drums 247, 245 and 243 (as described in connection with Fig. 1, and applying also to Fig. 2) is stirred into circulation by the stirrers 10 within the brake drum 247. This is in addition to the circulation developed within the drums 245 and 243 by the polar teeth 271. The result is that coolant is stirred throughout the length of connected drums 247, 245, 243.

Fig. 4 illustrates how the machine shown in Fig. 3 may be converted to eliminate its braking elements so as to operate as a coupling per se, with only a small number of part changes being required. Identical numerals on Figs. 3 and 4 indicate identical parts. The only part which is modified is drum 245 in Fig. 3, which in Fig. 4 is shorter and becomes drum 345.

The difference between Figs. 3 and 4 is that the brake coil 225 of Fig. 3 has been removed, along with its pole ring parts 207 and 209. The shorter drum, composed of elements 345 and 243, is substituted in Fig. 4 for the drum elements 247, 245 and 243 of Fig. 3. The stirrer 10 has also been removed. The drum support 253 is then bolted to drum element 345 and end bell 203 is bolted to the ring 211, thus eliminating all of the brake and brake stirrer parts at very small production cost. While the convenience of converting the brake-coupling structure of Fig. 3 to the coupling structure per se of Fig. 4 is best illustrated by Figs. 3 and 4, it will be understood that an analogous conversion may be accomplished as regards the Fig. 1 construction.

In Fig. 5 is shown an application of the invention to a punch press drive. In this case no control generator, such as shown at 111 in Fig. 1 and at 2 in Figs. 3 and 4, is required. Although a substantial part of the construction shown in Fig. 5 is analogous to that already described in connection with Figs. 1–4, the variations are such that new index characters are employed in the following description of said Fig. 5.

Numeral 18 in Fig. 5 shows in general a housing, which consists of an end bell 20 bolted to a magnetizable casing 22 which supports magnetizable pole rings 24 and 26 flanking a clutch exciter coil 28 and carrying interdigitated polar teeth 30 and 32, coupling the inside of coil 28 and having inside cylindric surfaces. The casing 22 also carries nontoothed pole rings 34 and 36, flanking a brake exciter coil 38, each of these pole rings 34 and 36 having smooth nontoothed inside cylindric surfaces.

Welded to one end of the casing 22 is a flange 40 to which is bolted a head 42 for enclosing the casing 22. The bolts 44, which perform the fastening, also hold in place a flywheel casing 46. A holding flange 48 of a driving motor M is bolted to the flywheel casing 46. The motor has stator parts 50 and rotor parts 52, shown diagrammatically, further description of these being unnecessary, since they are conventional. The rotor 52 is attached to a drive shaft 54 supported in a bearing 56 located in a fixed spider 58 of the motor M. At its other end, this shaft is supported in a bearing 60 of said head 42. Bearings 56 and 60 are thus substantially spaced axially so as accurately to align shaft 54. Beyond the bearing 56, the shaft 54 is provided with a fan 62, which is adapted to draw air through openings 64 in cover 66 and force it through openings 68 in the spider 58, through the magnetic gap between the stator 50 and rotor 52, and out from an air outlet 70 in the flywheel casing 46. Within the casing 46 the shaft 54 is provided with a flywheel 72.

Beyond the bearings 60, the shaft 54 has keyed thereto a magnetizable rotor 74 having axially extending magnetizable polar teeth 76. Axially considered, these teeth extend across the inner faces of the pole rings 34 and 36. At numeral 78 is shown an inductor drum assembly, one end of which axially traverses the polar teeth 30, 32 and the other end of which traverses the pole rings 34 and 36 and circumscribes the polar teeth 76. The drum assembly 78 is made in two parts joined by a nonmagnetic ring 80 in the central plane of coil 38.

The right-hand end of the drum 78 is carried on a drum support 82, keyed to a driven shaft 84 which is supported in a bearing 86 in the end bell 20. The end bell 20 has a cored hub 88 into which coolant may be let from a pipe 90. Openings 92 allow this coolant to escape into a flanged sealing portion 94 of the support 82. The coolant thus enters the drum 78 through passages between spokes 96 of the support. The path of the coolant is as shown by the darts in Fig. 5. Exit occurs through openings 98 in the drum 78, finally escaping through a channel 100 and out through an opening 102. While coolant has some access to the coils 28 and 38, they are not immersed. The coils are suitably housed in coolant-proof covers. The left-hand end of the drum 78 is carried on a solid support 104, carried on a bearing 106 located in the central portion of the head 42.

The advantages of the Fig. 5 construction as a punch press drive are several. In the first place, the over-all construction is compact, the motor, flywheel, coupling and brake being integrated in a small space. Liquid cooling of the drum 78 allows its size and weight to be very considerably reduced with respect to the weight of the corresponding drums such as shown, for example, in Patents 2,471,505 and 2,630,467. Moreover the time constant is reduced in bringing the speed of the drum 78 (and attached press parts) up to or near the speed of motor M when coil 38 is excited. Likewise, the time constant for deceleration by the excitation of the brake coil 28 is reduced. This is because the drum need not be made larger, as would be the case if air cooling were employed in connection with it, its moment of inertia being low with liquid cooling. For example, assume that the motor M is excited and turning at a constant speed, thus rotating shaft 54, flywheel 72 and rotor 74. When coil 38 is excited, the eddy-current magnetic coupling is effected by the polar teeth 76 and the left-hand end of the drum assembly 78. By reason of the small inertia of the drum, rapid acceleration occurs. Also, when the coil 38 is deexcited and brake coil 28 excited, the magnetic coupling between rotor 74 and drum assembly 78 promptly disappears and an eddy-current braking is effected by means of the polar teeth 30, 32 on the drum assembly. Both acceleration and deceleration are rapid, because of the relatively small size required of the drum 78, this small size being due to the rapidity with which heat may be abstracted therefrom by the coolant flowing therethrough. In other words, this drum assembly is not required to have large heat-dissipating surfaces.

A distinction will be observed between the organization of parts of Fig. 5 from the organizations shown in Figs. 1–4, in that the pilot bearing 67 of Fig. 1, or 267 of Figs. 3 and 4, has been omitted. Thus in Fig. 5 the shaft 54 is supported at one end on bearing 60 and at its other end at a substantial distance of bearing 56 of motor M.

It will be understood that the stirring element 10 shown in Fig. 3 may be used in connection with either the Fig. 1 or the Fig. 5 construction.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An electric coupling comprising a stationary annular field coil, magnetizable pole rings flanking said coil, said rings having circularly uninterrupted pole faces, a cylindrical rotary magnetizable inductor wall forming a first pair of magnetic gaps with respect to said pole rings, a magnetizable rotor having poles, said poles forming a second pair of gaps adjacent to said inductor wall, whereby upon excitation of said coil a toroidal magnetic field is produced looping through the first pair of gaps and in peripherally disposed flux concentrations through the second pair of gaps, said inductor wall being of a radial thickness adapted to convert said peripherally disposed flux concentrations at the second pair of gaps into a flux at said first pair of gaps which peripherally is substantially homogeneous, whereby upon relative rotation between said poles and the rotary inductor wall an eddy-current slip coupling effect is established therebetween but braking action is avoided at the circularly uninterrupted pole faces.

2. An electric coupling comprising a stationary annular field coil, magnetizable pole rings flanking said coil, said rings having circularly uninterrupted pole faces, cylindrical rotary magnetizable inductor walls forming a first pair of magnetic gaps with respect to said pole rings, nonmagnetic means separating said inductor walls, a magnetizable rotor having poles, said poles forming a second pair of gaps adjacent to and within said inductor walls, whereby upon excitation of said coil a toroidal magnetic field is produced looping through the first pair of gaps and in peripherally disposed flux concentrations through the second pair of gaps, said inductor wall being of a radial thickness adapted to convert said peripherally disposed flux concentrations at the second pair of gaps into a flux at said first pair of gaps which peripherally is substantially homogeneous, whereby upon relative rotation between said poles and the rotary inductor walls an eddy-current slip coupling effect is established therebetween but braking action is avoided at the circularly uninterrupted pole faces.

3. A combined electric clutch and brake comprising a casing containing two coaxially arranged annular field coils, opposite ends on said casing, shafts borne in said ends respectively, a solid magnetizable drum located in the casing within said coils, a solid member forming a support for said drum from one of said shafts near one of said ends, thereby forming a rotary cup within the casing, an open support for the end of the cup adjacent the other end of the casing and borne therein, a magnetizable toothed rotor carried on the other shaft adjacent said solid support member and having its teeth adjacent the inside of said drum within the magnetic influence of one only of said coils, a pair of uninterrupted pole rings flanking the last-mentioned coil and forming magnetic gaps outside of said drum, the other coil having a pair of interrupted pole rings surrounding said drum adjacent its open end, the end of the casing adjacent said open support including an inlet opening adapted to introduce coolant into the interior of said cup through said open support, said cup having outlet opening means adjacent said solid support member.

4. A combined electric clutch and brake comprising a casing containing two coaxially arranged annular field coils, opposite ends on said casing, shafts borne in said ends respectively, a solid magnetizable drum located in the casing within said coils, a solid member forming a support for said drum from one of said shafts near one of said ends, thereby forming a rotary cup within the casing, an open support for the end of the cup surrounding the other shaft adjacent the other end of the casing and borne therein, a magnetizable toothed rotor carried on said other shaft at a location adjacent said solid support member and having its teeth adjacent the inside of said drum, pairs of pole rings flanking said coils respectively and forming magnetic gaps outside of said drum, one coil and its pair of pole rings surrounding said drum and rotor, the other coil and its pair of pole rings surrounding said drum beyond said rotor, the end of the casing adjacent said open support including an inlet opening adapted to introduce coolant into the interior of said cup through said open support, said cup having outlet opening means adjacent said solid support member.

5. A combined electric clutch and brake made according to claim 4, wherein said rotor includes stirring means extending axially therefrom into proximity to the inside of said drum within the portions thereof not occupied by said rotor.

6. An electric coupling comprising a stationary annular field coil, axially disposed cylindric pole rings flanking said coil, said rings having circularly uninterrupted pole faces, rotary inductor drums forming a first pair of magnetic gaps with respect to said pole rings, nonmagnetic means separating adjacent portions of said pole faces and drums respectively, a rotor having magnetizable poles, said poles being axially disposed and forming a second pair of gaps adjacent said drums, whereby upon excitation of said coil a toroidal magnetic field is produced looping homogeneously through the first pair of gaps and in peripherally disposed flux concentrations through the second pair of gaps, said pole faces being constituted by cylinders of a diameter smaller than that of the inside of the coil, said drums being within the pole rings and the rotor being within said drums, said drums and said nonmagnetic means forming a solid drum assembly, a stationary casing containing said field coil and stationary pole rings, a shaft extending through one end of the casing and having a connection with one end of the drum assembly adapted to form a solid end support therefor, a second shaft extending through the other end of the casing and carrying said rotor, bearing means in said second end of the casing carrying an open supporting member for said drum assembly, said last-named end of the casing having openings adapted to introduce coolant into said drum assembly through the open support for axial movement through said drum assembly and through coolant outlet openings adjacent said solid support, said casing having at least one drain opening for coolant emerging from said last-named outlets.

7. A combined motor-driven electric clutch and brake combination for driving apparatus requiring a flywheel effect, comprising a motor having a drive shaft, a flywheel on said drive shaft adapted to provide said flywheel effect, a frame containing two coaxially arranged annular field coils, opposite end portions on said frame, one of which is attached to said motor, said motor drive shaft being carried in said attached end portion, a driven shaft in the other end portion, a solid drum located in the frame within said coils, pairs of pole rings flanking said coils respectively and forming magnetic gaps outside of said drum, one pair of pole rings having uninterrupted pole faces and the other pair having interrupted pole faces outside of the drum, a magnetizable toothed rotor carried on the motor shaft and having its teeth adjacent the inside of the drum in the general plane of said uninterrupted pole faces, a solid member forming a rotary support for one end of said drum and producing therewith a cup, and an open member forming a rotary support for the other end of the drum, the part of said frame adjacent said open support including an inlet adapted to introduce liquid coolant into the interior of said cup through said open support, said cup having outlet opening means adjacent said solid support.

8. A combined motor-driven electric clutch and brake combination made according to claim 7, wherein said solid support is adjacent the motor end of the frame and said open support and coolant inlet are adjacent the end of the frame through which extends said driven shaft.

9. A combined motor-driven electric clutch and brake combination made according to claim 8, wherein the frame forms an enclosure around the flywheel and said motor, and said motor includes air-cooling means therefor adapted to circulate air over the motor parts within the enclosure, said enclosure around the flywheel having an outlet for escape of said air.

References Cited in the file of this patent

UNITED STATES PATENTS

| | | |
|---|---|---|
| 2,367,636 | Winther | Jan. 16, 1945 |
| 2,389,572 | Winther | Nov. 20, 1945 |
| 2,409,557 | Gilfillan | Oct. 15, 1946 |
| 2,411,122 | Winther | Nov. 12, 1946 |
| 2,428,104 | Winther | Sept. 30, 1947 |
| 2,529,974 | Smith | Nov. 14, 1950 |
| 2,603,678 | Helmer | July 15, 1952 |

FOREIGN PATENTS

| | | |
|---|---|---|
| 218,400 | Germany | Jan. 31, 1910 |
| 559,109 | Great Britain | Feb. 4, 1944 |